US009198090B2

United States Patent
Ekman et al.

(10) Patent No.: US 9,198,090 B2
(45) Date of Patent: Nov. 24, 2015

(54) NODE AND METHOD FOR AOIP ADDRESS CHANGE

(75) Inventors: Per-Ove Ekman, Sturefors (SE); Paul Schliwa-Bertling, Ljungsbro (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 197 days.

(21) Appl. No.: 13/817,205

(22) PCT Filed: Aug. 17, 2010

(86) PCT No.: PCT/SE2010/050890
§ 371 (c)(1),
(2), (4) Date: Feb. 15, 2013

(87) PCT Pub. No.: WO2012/023886
PCT Pub. Date: Feb. 23, 2012

(65) Prior Publication Data
US 2013/0148633 A1      Jun. 13, 2013

(51) Int. Cl.
*H04L 29/06* (2006.01)
*H04W 92/04* (2009.01)
(Continued)

(52) U.S. Cl.
CPC ......... *H04W 36/0011* (2013.01); *H04L 47/122* (2013.01); *H04L 65/1026* (2013.01); *H04L 65/1036* (2013.01); *H04L 65/608* (2013.01);
(Continued)

(58) Field of Classification Search
CPC ............ H04W 36/0011; H04W 36/0022; H04W 36/00; H04W 36/0005; H04W 36/0027; H04W 36/0055; H04W 36/0066; H04W 36/18; H04W 80/04; H04W 36/0033; H04W 60/005; H04W 76/021; H04W 76/041; H04W 36/02; H04W 92/045; H04W 36/011; H04L 29/125; H04L 61/2084; H04L 29/12311; H04L 7/122; H04L 47/14
USPC ........................... 370/254–350; 709/201–213
See application file for complete search history.

(56) References Cited

U.S. PATENT DOCUMENTS 7,512,708 B2 *   3/2009  Read ............................. 709/245
8,634,838 B2 *   1/2014  Hellwig et al. ............... 455/445
(Continued)

FOREIGN PATENT DOCUMENTS

WO          0124558 A1     4/2001
WO       2008072199 A2    6/2008

OTHER PUBLICATIONS

3GPP TS 48.008 V9.3.0, Jun. 2010, pp. 1-209.

*Primary Examiner* — Ayaz Sheikh
*Assistant Examiner* — Debebe Asefa
(74) *Attorney, Agent, or Firm* — Patent Portfolio Builders, PLLC

(57) ABSTRACT

A first node (110, 115, 135, 200) for an IP connection with a second node over an A interface between a Access Network (101) and a Circuit Switched Core Network (122), said IP connection comprising an RTP and an RTCP connection. The first node has an RTP address comprising an IP address and a UDP port in the RTP connection and can change its RTP address and signal said change by a message to the second node (200, 135, 110, 115) over the RTCP connection and receive an ACK message. The first node is arranged to, following said change of RTP address, receive user plane data over the RTP connection from the second node at its changed and unchanged RTP address and to initiate an Internal handover with Mobile Switching Centre support if said ACK message from the second node is not received within a time limit.

18 Claims, 4 Drawing Sheets

(51) Int. Cl.
*H04W 36/00* (2009.01)
*H04L 29/12* (2006.01)
*H04L 12/803* (2013.01)
*H04L 12/801* (2013.01)
*H04W 36/02* (2009.01)

(52) U.S. Cl.
CPC ........... *H04L 29/12311* (2013.01); *H04L 47/14* (2013.01); *H04L 61/2084* (2013.01); *H04W 36/02* (2013.01); *H04W 92/045* (2013.01)

(56) References Cited

U.S. PATENT DOCUMENTS

| | | | | |
|---|---|---|---|---|
| 8,792,448 | B2* | 7/2014 | Nix | 370/329 |
| 8,880,073 | B2* | 11/2014 | Vikberg et al. | 455/436 |
| 2010/0135290 | A1* | 6/2010 | Curcio | 370/389 |

* cited by examiner

NODE AND METHOD FOR AOIP ADDRESS CHANGE

CROSS-REFERENCE TO RELATED APPLICATION

This application is a 35 U.S.C. §371 National Phase Entry Application from PCT/SE2010/050890, filed Aug. 17, 2010, and designating the United States.

TECHNICAL FIELD

The present invention discloses a node with an improved ability for changing the IP address and/or UDP port of a so called AoIP connection, i.e. an IP connection for user plane traffic over an A interface. The invention also discloses a corresponding method.

BACKGROUND

In, for example, GSM systems, the so called A interface is used to connect nodes in a Radio Access Network to nodes in a Circuit Switched Core Network. The nodes in the Radio Access Network can, for example, be a Base Station Subsystem, a BSS, which in turn comprises a Base Station Controller, a BSC, and one or more Base Transceiver Stations, BTS. An example of a node in the Circuit Switched Network to which the BSC or the BTS connect over the A interface is a Media Gateway, an MGw.

Recently, support has been introduced in GSM for user plane traffic over the A interface by means of the Internet Protocol, IP, so called AoIP, using an RTP connection for user plane data and an associated RTCP connection for control signaling.

In the RTP connection, the nodes at both ends of the connection will have an RTP address for the RTP connection, with the RTP address comprising an IP address and a UDP port. The associated RTCP connection will have the same IP address but a different UDP port.

In a GSM AoIP connection in which a node in a BSS is connected to a node such as, for example, a Media Gateway, MGw, in a Circuit Switched Core Network, either the BSS or the MGw can have a need to change its RTP address, i.e. either the IP address or the UDP port of the RTP address, or both of those parameters.

In order to handle such changes, a handover procedure has been introduced in the GSM standard. This standardized handover procedure is referred to as "Internal BSS Handover with MSC support", and is defined in 3GPP TS 48.008 Rel-8 and onwards. The MSC is a Mobile Switching Centre associated with the MGw in question.

The Internal BSS Handover with MSC support is useful, but causes an increased load on the A interface as well as on the nodes at both ends of the A interface.

SUMMARY

As explained above, there is a need for a solution by means of which the signaling load can be reduced when the IP address and/or UDP port of a node in an RTP connection over an A interface is changed. The solution should also be possible to apply in GSM systems as well as in other systems which use the A interface and Internal handover with Mobile Switching Centre support.

Such a solution is offered by the present invention in that it discloses a first node which is arranged for an IP connection with a second node over an A interface between a Radio Access Network and a Circuit Switched Core Network, with the IP connection comprising an RTP connection for user plane data and an associated RTCP connection for control signaling.

The first node is arranged to have an RTP address for the RTP connection, comprising an IP address and a UDP port, and is also arranged to make a change to the RTP address and to signal said change by transmitting a change message to the second node over the RTCP connection and to receive an ACK message over the RTCP connection from the second node in response.

In addition, the first node is arranged to, following its change to the RTP address, receive user plane data over the RTP connection from the second node at both its changed and unchanged RTP address and to initiate an Internal handover with Mobile Switching Centre support if said ACK message from the second node is not received within a defined time limit.

Thus, by means of the invention, the Internal handover with Mobile Switching Centre support is used only as a "backup" procedure, which means that it is used less frequently than previously, and thus the load which it causes on the A interface as well as on the nodes on both ends of the interface is reduced. If the Internal handover with Mobile Switching Centre support is used, this may or may not result in the first node having the RTP address which was attempted to change to in the first node's "own" attempt at a change of RTP address.

In one embodiment, the first node is arranged to transmit the address change message as a non-compound packet.

In one embodiment, the first node is arranged to transmit the address change message as a compound packet.

In one embodiment, the first node is a Base Station Transceiver or a Base Station Controller in a GSM Base Station Subsystem.

In one embodiment, the first node is a Media Gateway in a GSM Mobile Switching Centre Server.

The invention also discloses a first node which is arranged for an IP connection with a second node over an A interface between a Radio Access Network and a Circuit Switched Core Network, where the IP connection comprises an RTP connection for user plane data and an associated RTCP connection for control signaling. The first node is arranged to exchange user plane data with the second node which has an RTP address comprising an IP address and a UDP port for the RTP connection. The first node is also arranged to receive an address change message from the second node over the RTCP connection, where the address change message contains data regarding a change to the RTP address of the second node, and the first node is arranged to transmit an ACK message to the second node over the RTCP connection as a response to the address change message.

In addition, the first node is arranged to transmit user plane data to the second node at both its changed and unchanged RTP address until user plane data is received from the second node from its changed RTP address, at which point in time the first node is arranged to transmit user plane data to the second node only at its changed RTP address.

In one embodiment, the first node is arranged to receive the address change message as a non-compound packet.

In one embodiment, the first node is arranged to receive the address change message as a compound packet.

In one embodiment, the first node is a Base Station Transceiver or a Base Station Controller in a GSM Base Station Subsystem.

In one embodiment, the first node is a Media Gateway in a GSM Mobile Switching Centre Server.

The invention also discloses corresponding methods, i.e. the invention discloses a method of operating a first node in an IP connection over an A interface between a Radio Access Network and a Circuit Switched Core Network, where the IP connection comprises an RTP connection for user plane data and an associated RTCP connection for control signaling. The method comprises assigning an RTP address comprising an IP address and a UDP port to the first node, changing the RTP address of the first node, signaling said change to the second node by means of transmitting a change message to the second node over the RTCP connection and receiving an ACK message over the RTCP connection from the second node in response.

In addition, the method also comprises, following the change of RTP address, receiving user plane data from the second node at both the changed and unchanged RTP address of the first node and initiating an Internal Handover with Mobile Switching Centre support, if the ACK message from the second node is not received at the unchanged RTP address within a defined time limit.

Also disclosed is a method of operating a first node in an IP connection over an A interface between a Radio Access Network and a Core Network, where the IP connection comprises an RTP connection for user plane data and an associated RTCP connection for control signaling with a second node which has an RTP address comprising an IP address and a UDP, and receiving a change message from the second node over the RTCP connection containing data relating to a change in the RTP address of the second node.

The method further comprises transmitting an ACK message over the RTCP connection as a response to the change message from the second node, and transmitting user plane data to the second node at both its changed and unchanged RTP address until user plane data is received from the second node from its changed RTP address, at which point in time user plane data is sent to the second node's new RTP address only.

BRIEF DESCRIPTION OF THE DRAWINGS

The invention will be described in more detail in the following, with reference to the appended drawings, in which.

DETAILED DESCRIPTION

The invention will be described in the following with reference to a GSM system. However, it should be pointed out that the invention can also be applied in other systems which employ the A interface and Internal handover with Mobile Switching Centre support.

Figure 1:
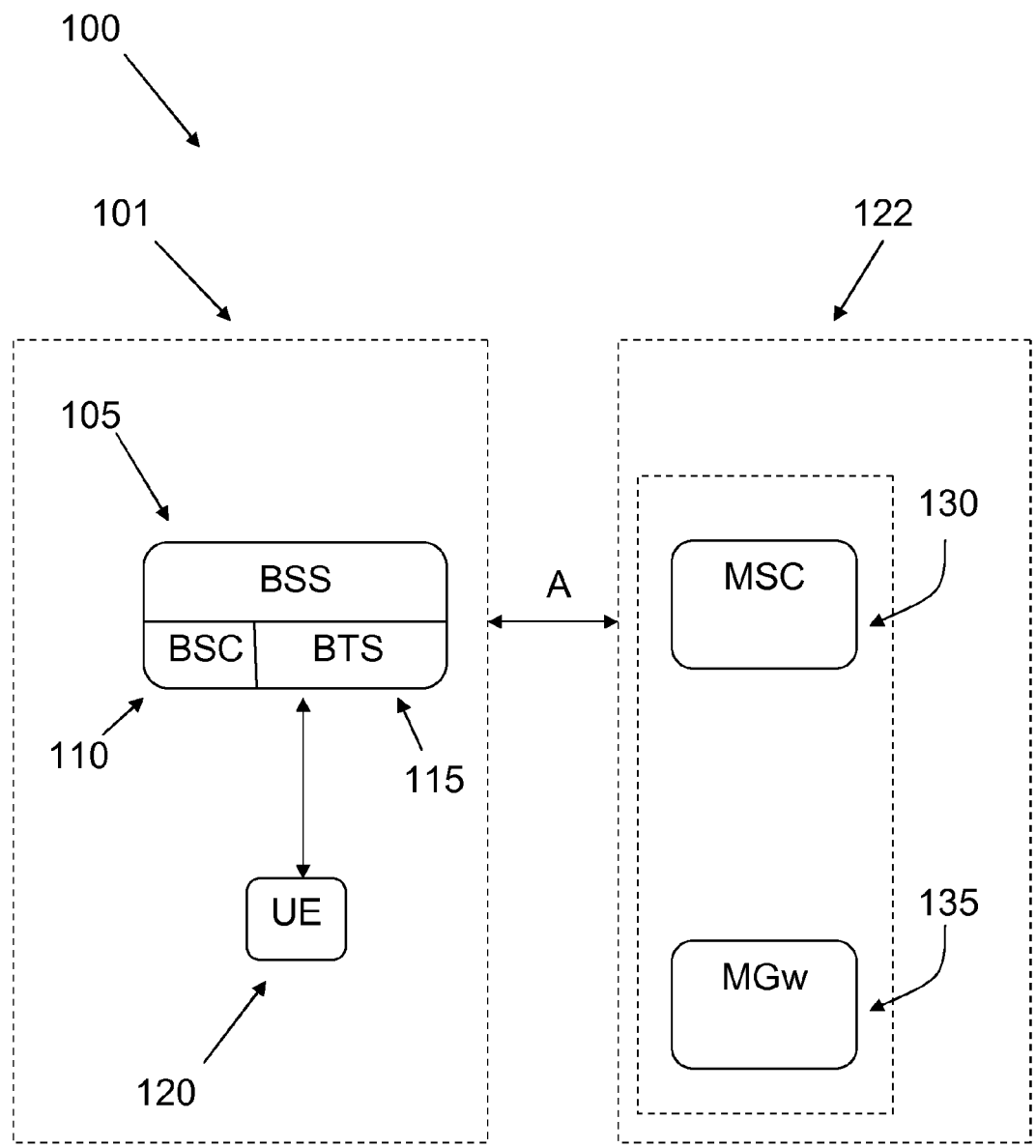
FIG. 1 shows a part of a system in which a device of the invention is used.

FIG. 1 shows a schematic view of a part of a GSM system 100 in which the invention is used. FIG. 1 shows a GSM Radio Access Network 101, with an IP connection over the so called A interface to a GSM Circuit Switched Core Network 122. The GSM Radio Access Network 101 shown in FIG. 1 comprises a GSM BSS, Base Station Subsystem, 105, which in turn comprises a Base Station Controller, BSC, 110, and a Base Transceiver Station, BTS, 115. For the sake of clarity, a User Equipment, UE 120, is shown as being connected to the BTS 115, although naturally a much larger number of UEs can be connected to the BTS 115. In addition, it should be mentioned that the BSC 110 can control more than one BTS, although only one BTS 115 is shown in FIG. 1.

The GSM Circuit Switched Core Network 122 shown in FIG. 1 comprises a Mobile Switching Centre, MSC 130, and a Media Gateway, MGw 135.

The A interface can be used for exchanging user plane data between a node in the BSS 105 and the MGw 135 by means of an IP, Internet Protocol, connection which comprises an RTP, Real time Transport Protocol, connection between the two, i.e. between the BSS 105 and the MGw 135, and an associated RTCP, RTP Control Protocol, connection between the two which is used for control plane signaling. An IP connection which comprises both an RTP and an RTCP connection will also be referred to as an RTP/RTCP connection in this text.

When an RTP/RTCP connection is established between the BSS 105 and the MGw 135, the actual connection is between two so called RTP/RTCP terminating peers. In the BSS 105, the RTP/RTCP terminating peer is either the BSC 110 or the BTS 115. In the RTP connection, each terminating peer has an IP address as well as a UDP port. It can be mentioned that the associated RTCP connection also has a UDP port, numbered as follows: the UDP port for the RTP connection is always a port with an even number, and the port for the associated RTCP connection is always the next consecutive port with an uneven number.

Either of the RTP/RTCP terminating peers can have a need to change its IP address and/or the UDP port used for the RTP connection. A change of UDP port for the RTP connection will, due to the principle explained above of consecutive odd/even UDP port numbers, bring about a change in the UDP port for the associated RTCP connection as well.

The invention discloses a GSM node which is arranged to have an IP connection over the A interface to a second node, where the IP connection comprises an RTP connection for user plane data and an associated RTCP connection for control signaling. The GSM node is arranged to have an RTP address which comprises an IP address and a UDP port for the RTP connection, and to change its RTP address, i.e. either the IP address and/or the UDP port used for the RTP connection, and to take certain actions in connection with this. This node, i.e. the node which changes its IP address and/or UDP port will here also be referred to as the "local peer".

The invention also discloses a GSM node which can be at "the other end" of the RTP/RTCP connection as seen from the local peer, and which will here also be referred to as the "remote peer". The remote peer is thus a node whose "other terminating peer", i.e. the local peer, changes its RTP address, i.e. either the IP address and/or UDP port used for the RTP connection, and the remote peer takes certain actions as a consequence of the fact that the local peer carries out such a change.

The generic term "GSM node" or simply "node" is used here both for the local and for the remote peer, since the invention can be applied in BSC, a BTS or in an MGw, all of which can be either the local or the remote peer.

Some details and embodiments of the invention will be described in the following by means of reference to a BTS such as the BTS 115 shown in FIG. 1. However, it should be kept in mind that the description by means of a BTS is merely an example intended to facilitate the reader's understanding of the invention, which can also be carried out in a BSC or in an MGw.

Figure 2:
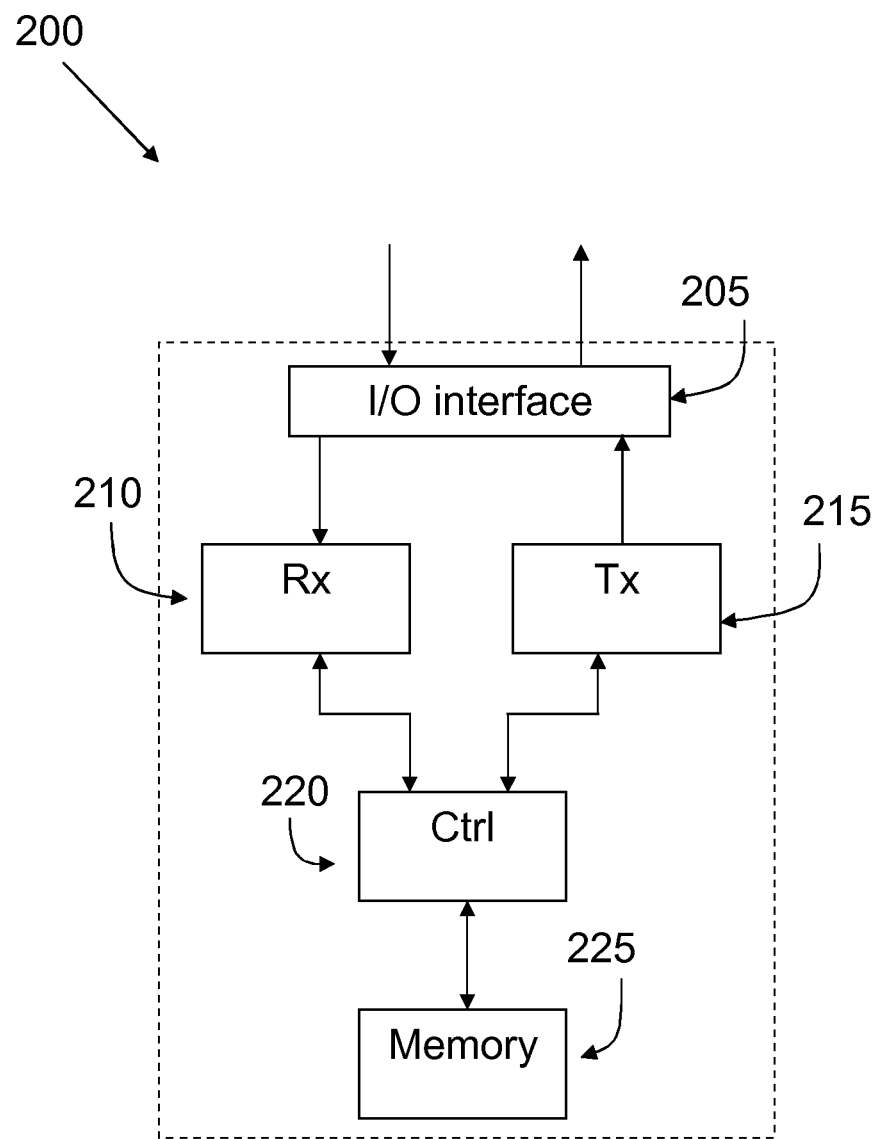
FIG. 2 shows a schematic block diagram of one embodiment of a node of the invention.

FIG. 2 shows a schematic block diagram of a GSM node, i.e. a terminating peer 200 of the invention. The block diagram shown in FIG. 2 can be seen as a generic block diagram of a BSC, BTS or an MGw.

As indicated in FIG. 2, the node 200 comprises a receiver 210 and a transmitter 215, which are controlled by a control function 220, which for example can be a processor such as a microprocessor. The receiver 210 and the transmitter 215 carry out reception and transmission, respectively, of signals from/to the node 200, i.e. from/to "lower" network entities such as UEs, and also perform reception and transmission from/to "higher" network entities. For example in the case that the node 200 is seen as a BTS, "higher" network entities could be exemplified by a BSC, through which communication over the A interface is carried out.

The node 220 also comprises a memory unit 225, which, inter alia, stores data for the control of the receiver 210 and the transmitter 215, as well as, where applicable, stores executable code for the control unit 220.

As indicated, the receiver 210 and the transmitter 215 are connected to an Input/Output (I/O) interface 205 which is comprised in the node 200, and which connects those units to such units as, for example, an antenna which may or may not be external to the node 200 and which is used for communication with UEs. In addition, the I/O unit 205 also connects the node 200 to traffic to/from the baseband level, baseband data from the receiver 210 is received, and from which baseband data to the transmitter 215 is supplied. In addition, the I/O interface 205 connects the node 200 to other units in the BSS, here to the BSC 105.

Using the same terminology as previously, the role of the node 200 as a local peer is as follows:

Using the I/O interface 205, the local peer 200 is arranged to have an IP connection comprising an RTP/RTCP connection over the A interface with a remote peer. In this RTP/RTCP connection, the local peer 200 is arranged to have an RTP address comprising an IP address and a UDP port for the RTP connection, which is suitably handled by the control unit 220, and one UDP port for the RTCP connection. The local peer 200 is arranged to exchange user plane data with the remote peer over the RTP connection, and to exchange control signaling over the RTCP connection.

Due to a number of factors, such as, for example, the resource situation, the node 200 may need to change its RTP address, i.e. the IP address and/or the UDP port used for the RTP connection, i.e. for the user plane data. Such a change is suitably administered by the control unit 220, When the node 200 changes its RTP address, this is signaled to the remote peer via the I/O interface by means of the transmit unit 215 transmitting a change message.

The node 200 is arranged to expect an ACK message from the remote peer over the RTCP connection in response to the change message. In addition, following the change of RTP address, the node 200 is arranged to receive user plane data from the remote peer at both its changed and unchanged RTP address. The terms "unchanged" and "changed" as used here refer to the RTP address before and after the change, respectively. When user plane data is received from the remote peer at the changed RTP address, the local peer, i.e. in this case the node 200, stops listening to its unchanged RTP address.

The local peer, i.e. the node 200, is also arranged to have a "timeout" period for the ACK message at its unchanged RTP address in response to the change message. This is arranged as follows: If the ACK message is not received from the remote peer within this timeout period, the node 200 is arranged to initiate a so called Internal Handover with Mobile Switching Centre support. This handover will also result in the desired change, i.e. a change in the RTP address of the node 200. Thus, by means of the invention, the Internal handover with Mobile Switching Centre support is only used as a "backup procedure", which thus reduces the signaling load on the local and remote peers involved, as well as reducing the load on the A interface. Suitably, the timeout period is less than 0.5 seconds. If the Internal handover with Mobile Switching Centre support is used, this may or may not result in the first node having the new RTP address which it was attempted to change to in the node's "own" attempt at a change of RTP address. In one embodiment, the node is arranged to inform the MSC of the desired new RTP address when initiating the Internal handover with Mobile Switching Centre support.

The node 200 can, in one embodiment, transmit the change message as a non-compound packet, whilst, in another embodiment, the address change message is transmitted as a compound packet.

In one embodiment of the invention, the node 200 is arranged to change the RTP address of the IP connection to an RTP address in another physical node. Since the UDP port for the associated RTCP connection is, as has been described, always the next consecutive UDP port with an uneven number, this will usually mean that the UDP port for the RTCP connection is also changed to the other physical node. In such an embodiment, it is the "old" local peer which is arranged to receive the ACK signal in response to the change message and to supervise the "ACK timeout" that controls if the Internal handover with Mobile Switching Centre support should be initiated or not.

In addition to nodes such as a BTS, a BSC or an MGw which are arranged to act as the local peer as described above, the invention also discloses such nodes, i.e. a BTS, a BSC or an MGw, which are arranged to act as the remote peer in the connection described above. A remote peer of the invention will be described in the following, using the node 200 as reference.

Using the same terminology as previously, the role of the node 200 as a remote peer is as follows:

Using the I/O interface 205 to interface with the local peer, the remote peer 200 has an RTP/RTCP connection over the A interface with the local peer, where the local peer has an RTP address comprising an IP address and a UDP port.

Via the I/O interface 205 and the receive unit 210, the remote peer 200 is arranged to receive a change message from the local peer over the RTCP connection, where the change message contains data relating to a change in the RTP address of the local peer.

In this role as remote peer, the node 200 is arranged to transmit an ACK message as a response to the change message, which is done by means of the transmit unit 215 and the I/O interface 205, administered by the control unit 220. The ACK message is suitably transmitted to the unchanged RTCP address of the local peer, and is transmitted over the RTCP connection.

In addition, the node 200 as a remote peer which receives a change message is also arranged to transmit user plane data to the local peer at both the changed and unchanged RTP address of the local peer until user plane data is received from the local peer from its changed RTP address, at which point in time the remote peer 200 is arranged to transmit user plane data to the local peer at its changed RTP address only. As stated previously, the terms "unchanged" and "changed" as used here refer to the RTP address before and after the change, respectively. The RTP address, i.e. the IP address and UDP port, of a message from the local peer is suitably checked by the control unit 220, and compared with the unchanged RTP address, which is suitably stored in the memory unit 225, in order to see if messages are sent from the changed or from the unchanged RTP address.

In one embodiment as a remote peer, the node 200 is arranged to receive the change message as a non-compound packet.

In one embodiment as a remote peer, the node 200 is arranged to receive the change message as a compound packet.

Although the node 200 described above has been described first as acting as a local peer and then as acting as a remote peer, it should be pointed out that the invention naturally also covers a node which is arranged to act both as the local and as the remote peer described above.

Figure 3:
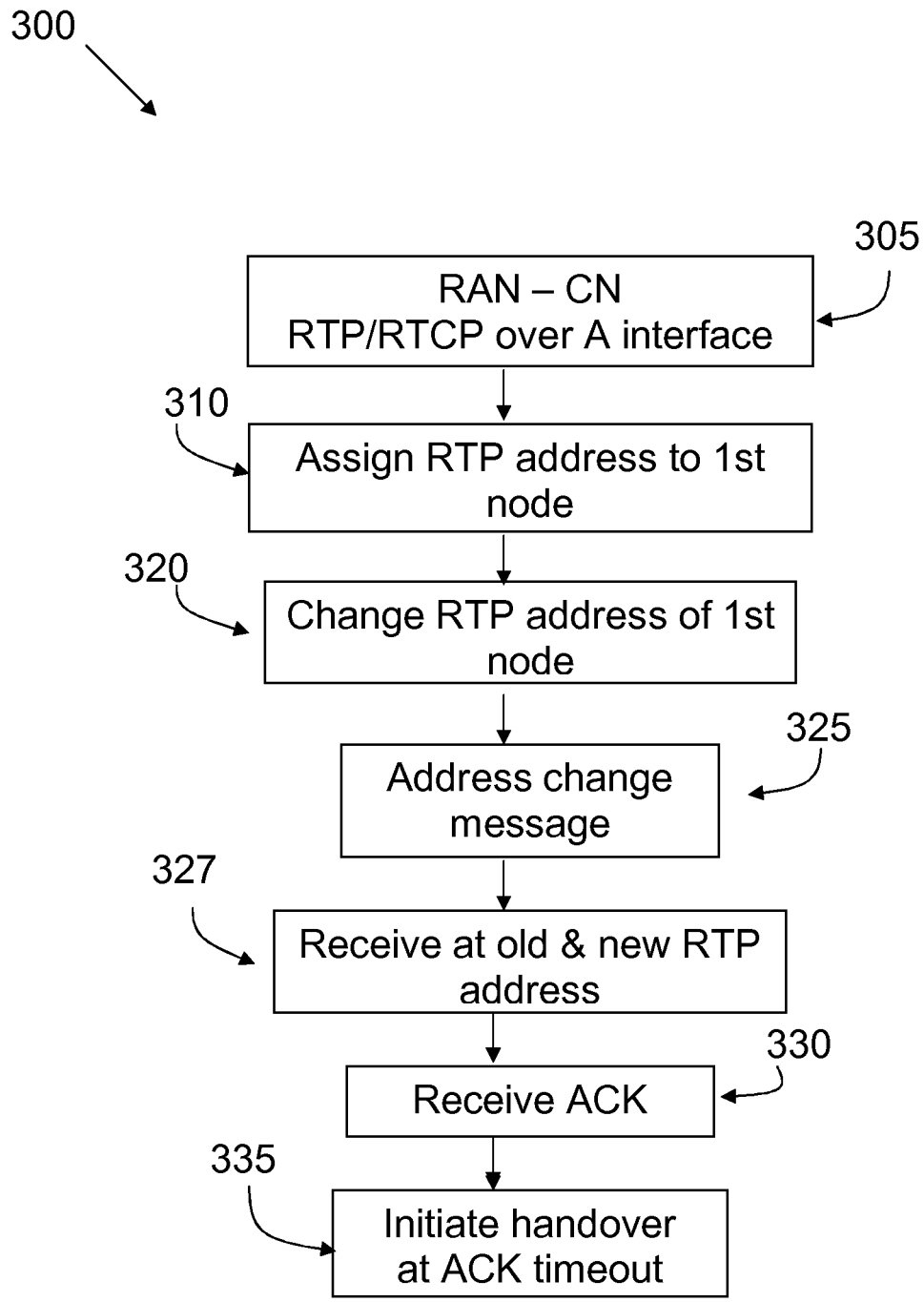
FIGS. 3 and 4 show schematic flow charts of embodiments of a method of the invention.

The invention also discloses a method for operating a GSM node as the local peer described above. A flow chart of this method 300 is shown in FIG. 3. As indicated in step 305, the method comprises operating the node in an IP connection over an A interface between a GSM Radio Access Network and a GSM Circuit Switched Core Network, the IP connection comprising an RTP connection for user plane data and an associated RTCP connection for control signaling.

As shown in step 310, the method comprises assigning an RTP address, which comprises an IP address and a UDP port, to the GSM node, as well as changing, step 320, the RTP address of the GSM node. The change of RTP address can comprise a change to the IP address and/or the UDP port which are comprised in the RTP address.

In addition, the method comprises, step 325, transmitting an address change message comprising the details of the change to the second GSM node over the RTCP connection and receiving, step 330, an ACK message over the RTCP connection from the second GSM node in response.

As indicated in step 327, the method 300 also comprises, following the address change, receiving user plane data from the second GSM node at both the changed and unchanged RTP address of the first GSM node and initiating, step 335 an Internal Handover with Mobile Switching Centre support, if the ACK message from the second GSM node is not received at the unchanged RTP address within a defined time limit.

In one embodiment of the method 300, the address change message to the second GSM node is transmitted as a non-compound packet.

In one embodiment of the method 300, the address change message to the second GSM node is transmitted as a compound packet.

In one embodiment, the method comprises changing the RTP address of the IP connection in the GSM node to an RTP address in another physical GSM node. Since the UDP port for the associated RTCP connection is, as has been described, always the next consecutive UDP port with an uneven number, this will usually mean that the UDP port for the RTCP connection is also changed to the other physical node. In such an embodiment, it is the "old" local peer which receives the ACK signal in response to the change message and which supervises the "ACK timeout" that controls if the Internal handover with Mobile Switching Centre support should be initiated or not.

Figure 4:
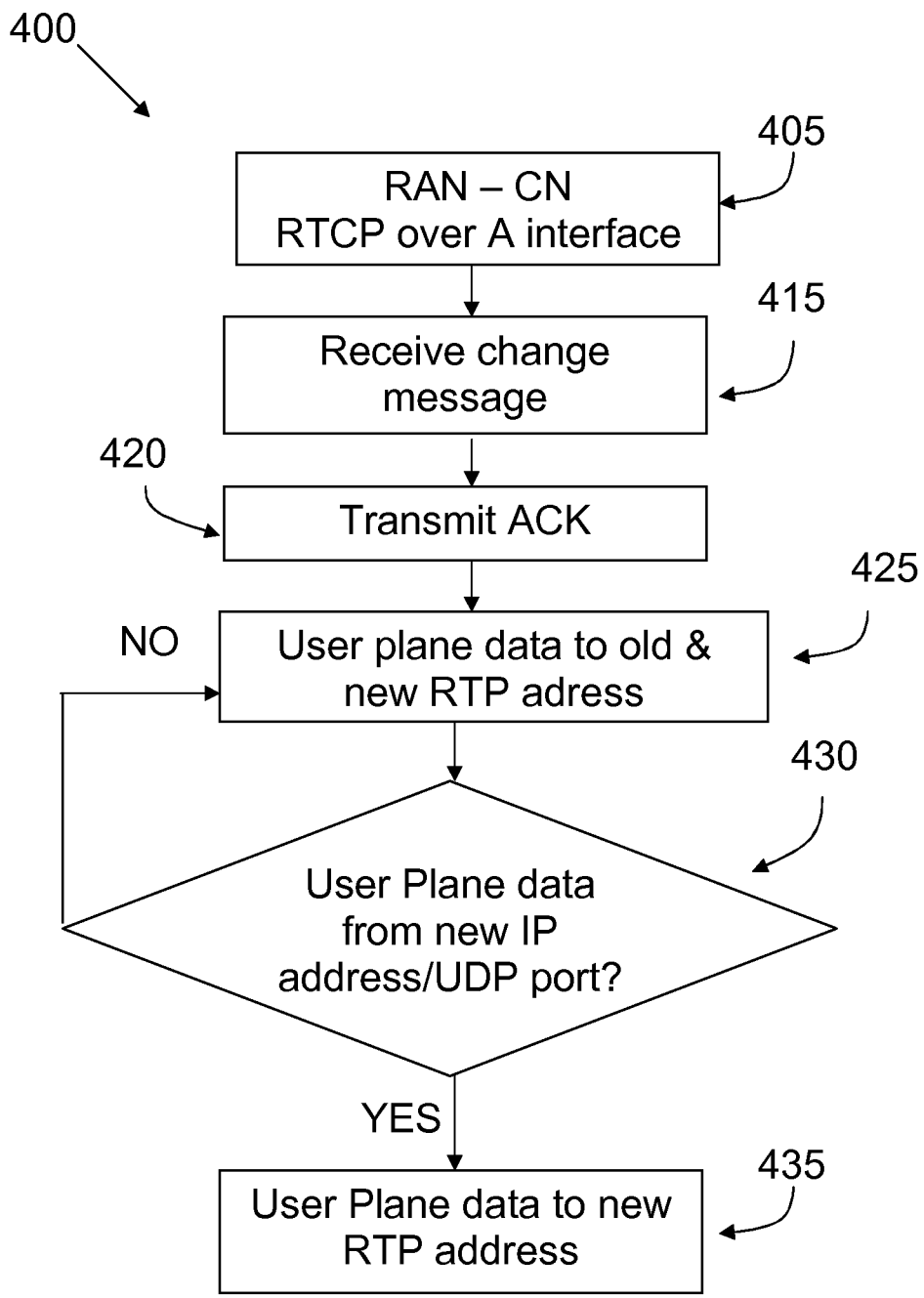

The invention also discloses a method for operating a GSM node as the remote peer node described above. A flow chart of this method 400 is shown in FIG. 4. As indicated in step 405, the method comprises operating the GSM node in an IP connection over an A interface between a GSM Radio Access Network and a GSM Core Network, where the IP connection comprises an RTP connection for user plane data and an associated RTCP connection for control signaling, with a second node which has an RTP address comprising an IP address and a UDP port in said RTP connection The method comprises receiving, step 415, a change message from the second GSM node over the RTCP connection containing data relating to a change in the RTP address of the second node.

The method 400 further comprises transmitting, step 420, an ACK message over the RTCP connection as a response to the change message from the second GSM node and also comprises transmitting, step 425, user plane data to the second GSM node at both its changed and unchanged RTP address until, as shown in step 430, user plane data is received from the second GSM node from its changed RTP address, at which point in time user plane data is sent, step 435, to the second node's new RTP address only.

In one embodiment of the method 400, the address change message from the second GSM node is received as a non-compound packet.

In one embodiment of the method 400, the address change message from the second GSM node is received as a compound packet.

Both the method 300 and the method 400 can be applied in a Base Station Transceiver or a Base Station Controller in a GSM Base Station Subsystem, as well as in a Media Gateway in a GSM Mobile Switching Centre Server.

Embodiments of the invention have been described with reference to the drawings, such as block diagrams and/or flowcharts. It should be pointed out that several blocks of the block diagrams and/or flowchart illustrations and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A first node being arranged for an IP connection with a second node over an A interface between a Radio Access Network and a Circuit Switched Core Network, said IP connection comprising an RTP connection for user plane data and an associated RTCP connection for control signaling, the first node being arranged to have an RTP address for the RTP connection, the RTP address comprising an IP address and a UDP port, and being arranged to make a change to the RTP address and to signal said change by transmitting a change message to the second node over the RTCP connection and to receive an ACK message over the RTCP connection from the second node in response, wherein the first node is arranged to, following said change to the RTP address, receive user plane data over the RTP connection from the second node at both its changed and unchanged RTP address and to initiate an Internal handover with Mobile Switching Centre support if said ACK message from the second node is not received within a defined time limit.

2. The first node of claim 1, being arranged to transmit the address change message as a non-compound packet.

3. The first node of claim 1, being arranged to transmit the address change message as a compound packet.

4. A first node being arranged for an IP connection with a second node over an A interface between a Radio Access Network and a Circuit Switched Core Network, said IP connection comprising an RTP connection for user plane data and an associated RTCP connection for control signaling, the first node being arranged to exchange user plane data with the second node which has an RTP address comprising an IP address and a UDP port for said RTP connection, the first node being arranged to receive an address change message from the second node over the RTCP connection, said address change message containing data regarding a change to the RTP address of the second node, the first node being arranged to transmit an ACK message to the second node over the RTCP connection as a response to the address change message, wherein the first node is arranged to transmit user plane data to the second node at both its changed and unchanged R P address until user plane data is received from the second node from its changed RTP address, at which point in time the first node is arranged to transmit user plane data to the second node only at its changed RTP address.

5. The first node of claim 4, being arranged to receive the address change message as a non-compound packet.

6. The first node of claim 4, being arranged to receive the address change message as a compound packet.

7. The first node of claim 1, being a Base Station Transceiver or a Base Station Controller in a GSM Base Station Subsystem, or a Media Gateway in a GSM Mobile Switching Centre Server.

8. A method of operating a first node in an IP connection over an A interface between a Radio Access Network and a Circuit Switched Core Network, the IP connection comprising an RTP connection for user plane data and an associated RTCP connection for control signaling, the method comprising:

assigning an RTP address comprising an IP address and a UDP port to the first node,
changing the RTP address of the first node,
signaling said change to the second node by transmitting a change message to the second node over the RTCP connection,
receiving an ACK message over the RTCP connection from the second node in response,
following the change of RTP address, receiving user plane data from the second node at both the changed and unchanged RTP address of the first node, and
initiating an Internal Handover with Mobile Switching Centre support, if said ACK message from the second node is not received at the unchanged RTP address within a defined time limit.

9. The method of claim 8, wherein the address change message is transmitted as a non-compound packet.

10. The method of claim 8, wherein the address change message is transmitted as a compound packet.

11. A method of operating a first node in an IP connection over an A interface between a Radio Access Network and a Core Network, the IP connection comprising an RTP connection for user plane data and an associated RTCP connection for control signaling, with a second node which has an RTP address comprising an IP address and a UDP address, comprising:

receiving a change message from the second node over the RTCP connection containing data relating to a change in the RTP address of the second node,
transmitting an ACK message over the RTCP connection as a response to the change message from the second node, and
transmitting user plane data to the second node at both its changed and unchanged RTP address until user plane data is received from the second node from its changed RTP address, at which point in time user plane data is sent to the second node's new RTP address only.

12. The method of claim 11, wherein the change message is transmitted as a non-compound packet.

13. The method of claim 11, wherein the change message is transmitted as a compound packet.

14. The method of claim 11, applied to a Base Station Transceiver or a Base Station Controller in a GSM Base Station Subsystem, or a Media Gateway in a GSM Mobile Switching Centre Server.

15. A method performed by a first node of a mobile communications network, wherein the first node comprises a transmitter, a receiver, and control function, the method comprising:

the first node sending user plane data to a first user plane destination address;
the first node receiving from a second node a change of address message indicating that the first user plane destination address has been changed and identifying a new user plane destination address that is different than the first user plane destination address; and
as a result of the change of address message, the first node:
(a) sending an acknowledgement message to a control plane destination address, which is different than the first and new user plane destination addresses, and (b) sending user plane data to both the first user plane destination address and the new user plane destination address until user plane data is received from the new user plane destination address, wherein
when the first node receives user plane data from the new user plane destination address, the first node ceases sending user plane data to the first user plane destination address, but continues to send user plane data to the new user plane destination address.

16. The method of claim 15, wherein
the first user plane destination address comprises a network address and a port number, the control plane destination address comprises a network address and a port number, the new user plane destination address comprises a network address that is the same as the network address of the first user plane destination address and a port number that is different than the port number of the first user plane destination address.

17. The method of claim 15, wherein the first user plane destination address comprises a network address and a port number, the control plane destination address comprises a network address and a port number, the new user plane destination address comprises a network address that is different than the network address of the first address and a port number that is the same as the port number of the first user plane destination address.

18. The method of claim 15, wherein the first user plane destination address comprises a network address and a port number, the control plane destination address comprises a network address and a port number, the new user plane destination address comprises a network address that is different than the network address of the first address and a port number that is different than the port number of the first user plane destination address.

* * * * *